(12) United States Patent
Adams et al.

(10) Patent No.: US 12,287,556 B2
(45) Date of Patent: Apr. 29, 2025

(54) SYSTEMS AND METHODS FOR CONTROLLING A DYNAMIC DISPLAY

(71) Applicant: THE BOEING COMPANY, Arlington, VA (US)

(72) Inventors: Scott Alan Adams, Everett, WA (US); Edward Ryan Greene, Charleston, SC (US); Peter Babilo, Mission Viejo, CA (US)

(73) Assignee: The Boeing Company, Arlington, VA (US)

( * ) Notice: Subject to any disclaimer, the term of this patent is extended or adjusted under 35 U.S.C. 154(b) by 55 days.

(21) Appl. No.: 18/325,241

(22) Filed: May 30, 2023

(65) Prior Publication Data

US 2024/0302706 A1    Sep. 12, 2024

Related U.S. Application Data

(63) Continuation-in-part of application No. 18/180,182, filed on Mar. 8, 2023.

(51) Int. Cl.
*G02F 1/1685* (2019.01)
*B64D 47/00* (2006.01)
*G02F 1/167* (2019.01)
*G02F 1/1675* (2019.01)

(52) U.S. Cl.
CPC .......... *G02F 1/1685* (2019.01); *B64D 47/00* (2013.01); *G02F 1/167* (2013.01); *G02F 1/1675* (2019.01)

(58) Field of Classification Search
CPC ...... G02F 1/1685; G02F 1/1675; G02F 1/167; B64D 47/00

USPC .................................................. 359/267, 296
See application file for complete search history.

(56) References Cited

U.S. PATENT DOCUMENTS

| | | | |
|---|---|---|---|
| 2003/0117424 A1* | 6/2003 | Kinoshita | G02B 26/026 715/700 |
| 2008/0158651 A1* | 7/2008 | Kawase | G02F 1/167 359/296 |
| 2012/0001889 A1* | 1/2012 | Kimura | H01L 27/1225 345/212 |
| 2014/0264294 A1 | 9/2014 | Holman | |
| 2021/0132459 A1 | 5/2021 | Bull | |
| 2023/0357578 A1* | 11/2023 | Jo | C03C 17/28 |

FOREIGN PATENT DOCUMENTS

EP        3257590       12/2017
WO    WO 2004/049045    6/2004

OTHER PUBLICATIONS

Extended European Search Report for EP App. No. 24154983.1-1001, dated Jun. 25, 2024.

* cited by examiner

*Primary Examiner* — William Choi
(74) *Attorney, Agent, or Firm* — Joseph M. Butscher; The Small Patent Law Group LLC (57) ABSTRACT

A system and a method include a substrate having a surface, such as an exterior surface of a vehicle. An electrophoretic display is disposed on the surface. A control unit is coupled to the electrophoretic display. The control unit is configured to selectively change one or more properties of the electrophoretic display.

21 Claims, 6 Drawing Sheets

SYSTEMS AND METHODS FOR CONTROLLING A DYNAMIC DISPLAY

CROSS-REFERENCE TO RELATED APPLICATION

This application is a continuation-in-part of U.S. patent application Ser. No. 18/180,182, filed Mar. 8, 2023, entitled "Systems and Methods for Forming a Dynamic Display," which is hereby incorporated by reference in its entirety.

FIELD OF THE DISCLOSURE

Examples of the present disclosure generally relate to systems and methods for forming and controlling a dynamic display, which can be disposed on or within a vehicle, such as an aircraft, a spacecraft, or the like.

BACKGROUND OF THE DISCLOSURE

Aircraft are used to transport passengers and cargo between various locations. Decorative surfaces are created within interior cabins of various types of aircraft. Such decorative surfaces can be formed by using paint, ink, or similar fluid material. The decorative surfaces are typically static, and cannot be changed. Conversely, electronic displays (such as light emitting diode or liquid crystal displays) are configured to provide changeable content, but require significant power, can be large and bulky, and may exhibit inconsistent visibility under different conditions (such as if sunlight is shining thereon).

Various vehicles such as aircraft or spacecraft have outer surfaces that can be painted or coated particular colors. Coatings typically contain a pigment with a fixed visible color and performance properties, such as reflectance, solar absorptance, and emissivity value.

Various consumer-based electronic display devices utilize films including color-changing pigments. However, the films lack the durability to withstand environments experienced by various vehicles. Further, simply wrapping a surface with a consumer grade film adds unnecessary weight, and typically does not meet particular requirements for various types of vehicles.

SUMMARY OF THE DISCLOSURE

A need exists for a system and a method for dynamically controlling an outer surface of a vehicle, such as an aircraft, spacecraft, or the like.

With that need in mind, certain examples of the present disclosure provide a system including a substrate having a surface. An electrophoretic display is disposed on the surface. A control unit is coupled to the electrophoretic display. The control unit is configured to selectively change one or more properties of the electrophoretic display.

In at least one example, the substrate is a portion of a vehicle. The vehicle can be an aircraft. The vehicle can be a spacecraft. The surface can be an exterior surface of the vehicle.

In at least one example, the electrophoretic display includes microcapsules that contain pigment. The microcapsules are configured to change appearance when subjected to an electrical signal applied by the control unit. The electrophoretic display can also include a conductive coating. The electrophoretic display can also include a clear coat. In at least one example, the electrical signal includes an electrical charge applied above or below the conductive coating to shift a pigment position of one or more of the microcapsules and alter an absorptance or reflectance of the surface.

In at least one example, the control unit is configured to selectively change the one or more properties of the electrophoretic display by applying an electric charge to the electrophoretic display. In at least one example, the control unit is configured to electrically rotate one or more microcapsules of the electrophoretic display to present a desired pigment on the substrate.

Certain examples of the present disclosure provide a vehicle including a substrate having a surface. An electrophoretic display is disposed on the surface. A control unit is coupled to the electrophoretic display. The control unit is configured to selectively change one or more properties of the electrophoretic display.

Certain examples of the present disclosure provide a method including disposing an electrophoretic display on a surface of a substrate, wherein the electrophoretic display comprises microcapsules that contain pigment, and wherein the microcapsules are configured to change appearance when subjected to an electrical signal; and selectively changing, by a control unit coupled to the electrophoretic display, one or more properties of the electrophoretic display. In at least one example, said selectively changing includes applying an electric charge to the electrophoretic display, and wherein said applying the electric charge rotates one or more of the microcapsules of the electrophoretic display to present a desired pigment on the substrate.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a vehicle, such as an aircraft or spacecraft, having one or more surfaces (such as an exterior surface) that include color-changing microcapsules, which can be incorporated into a paint or coating system. The microcapsules are configured to vary absorptance or reflectance (emissivity) based on a temporarily applied electrical charge, which can be applied above or below the microcapsules. A coating can cover the microcapsules and provide mechanical, chemical, and electrostatic protection.

Examples of the present disclosure provide systems and methods that allow properties of a functional aerospace coating to be changed based on a commanded electrical signal. Varying surface emissivity allows an aircraft or spacecraft to change the ability of a coated surface to better reflect or absorb electromagnetic radiation, which can be used to optimize performance of spacecraft or aircraft thermal management systems.

In at least one example, systems and methods include electrically controllable particles having highly absorbent and reflective pigments suspended within a fluid inside a microcapsule. The microcapsule can be electrically rotated to present a desired pigment to a surface, such as an exterior surface of a vehicle. In at least one example, the microcapsules are protected by a protective coating. An electrical charge can be applied above or below the coating to shift the pigment position and alter the absorptance or reflectance of the surface.

Examples of the present disclosure can be used in relation to coatings that provide high durability, lightweight, controllable solar absorptance for aircraft, spacecraft, automobiles, marine applications, buildings, batteries, and other applications that manage thermal properties. In at least one example, the coatings add little to no weight to a vehicle. Further, in at least one example, the systems and methods are configured to adapt an exterior appearance (such as by changing color, absorptance, reflectance, and/or the like) without the use of mechanical moving parts.

Figure 1A:
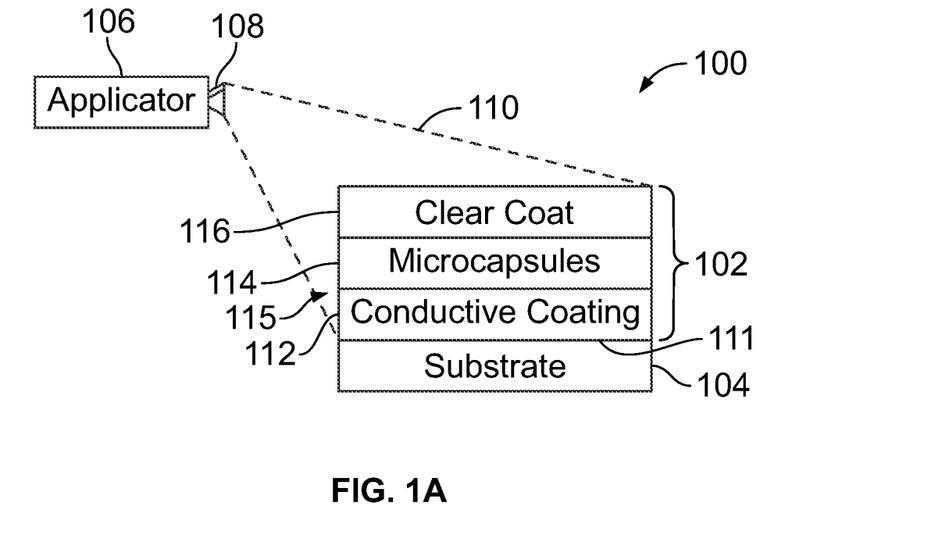
FIG. 1A illustrates a simplified block diagram of a system for forming an electrophoretic display on a substrate, according to an example of the present disclosure.

FIG. 1A illustrates a simplified block diagram of a system 100 for forming an electrophoretic display 102 on a substrate 104, according to an example of the present disclosure. The substrate 104 can be formed of a metal, such as aluminum, steel, or the like. As another example, the substrate 104 can be formed of a composite material. The substrate 104 can be flat or have a curved and/or contoured surface. In at least one example, the substrate 104 is on or within a vehicle, such as a commercial aircraft, a spacecraft, an automobile, a train car, and/or the like. For example, the substrate 104 can be disposed on a wall, ceiling, floor, stowage bin, seat, or the like within an internal cabin of the vehicle. As another example, the substrate 104 is an exterior surface of a vehicle.

An applicator 106 includes one or more nozzles 108 that emit a fluid 110, such as a paint, onto a surface 111 of the substrate 104. The fluid 110 can be a liquid electrophoretic paint. In at least one example, the fluid 110 includes a conductive coating 112, microcapsules 114, and a clear coat 116 mixed together. The clear coat 116 provides a protective sealing barrier, and can prevent the microcapsules 114 from moving. The microcapsules 114 are electrophoretic capsules that contain pigment, which can change appearance and performance properties when subjected to an electrical signal (such as a voltage) applied by a control unit, as described herein. The conductive coating 112 provides the voltage used to manipulate pigment in the microcapsules 114.

In at least one example, the applicator 106 applies the electrophoretic paint having the conductive coating 112, the microcapsules 114, and the clear coat 116 mixed together as a single fluid. As another example, the conductive coating 112 and the microcapsules 114 can be mixed together and first applied as a fluid 110 on the surface 111 of the substrate 104 before a fluid 110 in the form of a clear coat 116 is applied over the intermixed conductive coating 112 and microcapsules 114. That is, a first fluid 110 including the conductive coating 112 and the microcapsules 114 in liquid or aerosolized form is first applied to the substrate by the applicator 106, and then a second fluid 110 including the clear coat in liquid or aerosolized form is subsequently applied by the applicator 106 over the conductive coating 112 and the microcapsules 114.

In at least one other example, the applicator 106 first applies a first fluid 110 including the conductive coating 112 onto the surface 111 of the substrate 104. Next, the applicator 106 applies a second fluid 110 including the microcapsules 114 over and onto the conductive coating 112, which was previously deposited by the applicator 106. Finally, the applicator 106 applies a third fluid 110 including the clear coat 116 is applied over and onto the microcapsules 114, which was previously deposited by the applicator 106.

The conductive coating 112 can be formed of one or more conductive materials, such as conductive inks. The clear coat 116 can be a clear, base coat, such as a clear resin. The microcapsules 114 are able to be seen through the transparent clear coat 116. The clear coat 116 provides a barrier that protects the microcapsules from being damaged.

The applicator 106 applies one or more fluids 110 including the conductive coating 112, the microcapsules 114, and the clear coat 116 onto the substrate 104 to form the electrophoretic display 102 on the surface 111 of the substrate 104, forming a dynamic display. The applicator 106 applies electronic ink 115 and the conductive coating 112 directly on the surface 111 of the substrate 104, such as within an internal cabin of a vehicle. The electronic ink 115 includes the microcapsules 114 (for examples, millions or more). The microcapsules 114 contain charged pigments that can be manipulated when electricity is applied via the conductive coating 112, thereby creating a dynamic appearance and performance properties, as desired. The electrophoretic display 102 is configured to retain an appearance with no power required until desired, thereby providing a changeable display that consumes less power than light emitting diode or liquid crystal displays.

In at least one example, the applicator 106 includes an inkjet print head or paint atomizer. The applicator 106 can be integrated into a robot, a gantry end effector, and/or the like. The applicator 106 can first deposit the conductive coating 112 as a first layer, and the microcapsules 114 as a second layer. The conductive coating 112 provides electrical continuity to manipulate pigment within the microcapsules 114. The clear coat 116, which provides a protective barrier for the microcapsules 114 and the conductive layer 112, can then be deposited by the applicator 106 as a third layer. The electrophoretic display 102 can be directly integrated onto various surfaces, such as flat surfaces, curved surfaces, and the like.

Optionally, the applicator 106 may not be used to form the electrophoretic display 102. For example, the electrophoretic display 102 can be separately formed, whether by the applicator 106 or not, and secured to the substrate 104. As an example, the electrophoretic display 102 can be mounted directly onto the substrate 104, such as via one or more fasteners, adhesives, and/or the like.

The electrophoretic display 102 is configured to be dynamically changed, so that appearances and performance properties thereof can be changed on demand, as desired. Such dynamic changing is enabled by the electronic ink 115, which includes the microcapsules 114 that contain charged pigment, such as black and white pigment. The visible color depends on the charge imparted on the pigment(s). For example, a black pigment may be positively charged, and a white pigment may be negatively charged. Each microcapsule 114 contains charged colored pigments, such as black and white, which can be manipulated by an electric field to create a desired appearance.

The electrophoretic display 102 within an interior cabin of a vehicle, such as a commercial aircraft, provides various aesthetic advantages, which can be selectively changed, as desired. The systems and methods described herein allow for electrophoretic displays to be fluidly formed on various surfaces, whether flat or curved. In contrast, typical electrophoretic displays are provided by flat conductive films or thin film transistors that have limited flexibility. Flexing such displays may result in damage thereto. As such, typical electrophoretic displays are generally not amenable parts to complex curvatures. In contrast, examples of the present disclosure provide systems and methods configured to apply the electrophoretic display 102, via the one or more fluids 110, directly on the surface 111 of the substrate 104, thereby allowing the formed electrophoretic display 102 to conform to the surface 111.

In at least one example, the electrophoretic display 102 is secured to an exterior surface of a vehicle. For example, the substrate 104 can be one or more portions of an exterior surface of a vehicle. In particular, the substrate 104 can be one or more of a fuselage, a wing, one or more control surfaces, and/or the like of an aircraft. As another example, the substrate 104 can be an exterior surface of a spacecraft. As another example, the substrate 104 can be a portion of a fixed structure, such as a commercial or residential building.

In at least one example, the electrophoretic display 102 provides a variable color coating for an interior or exterior surface of the substrate 104, such as an interior or exterior of a vehicle. The microcapsules 114 provide electrostatically-controlled pigment particles that can be incorporated into the coating.

Figure 1B:
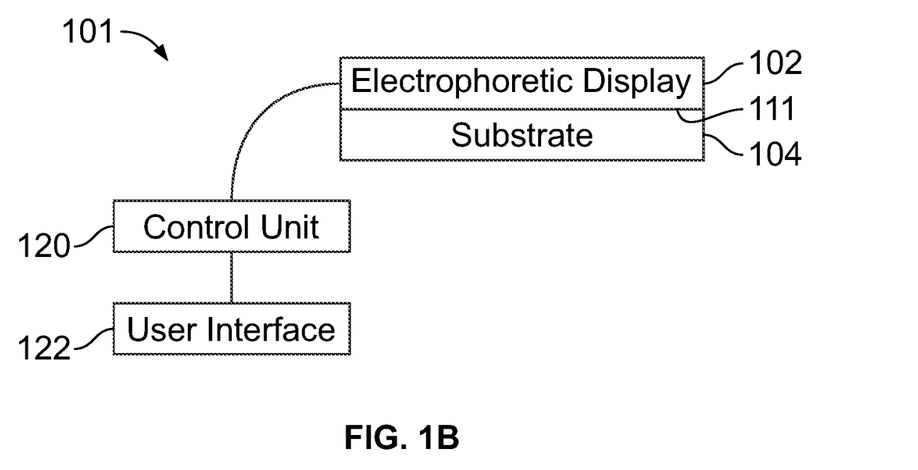
FIG. 1B illustrates a simplified block diagram of a system for controlling an electrophoretic display disposed on a substrate, according to an example of the present disclosure.

FIG. 1B illustrates a simplified block diagram of a system 101 for controlling an electrophoretic display 102 disposed on a substrate 104, according to an example of the present disclosure. The substrate 104 can be one or more surfaces of a vehicle, such as an aircraft or spacecraft. The surface(s) can be interior or exterior surfaces of the vehicle. The electrophoretic display 102 can be formed by the applicator 106, as described herein. As another example, the electrophoretic display 102 can be separately formed and mounted on the substrate 104.

The system 101 includes a control unit 120 in communication with the electrophoretic display 102, such as through one or more wired or wireless connections. In at least one example, the control unit 120 and the electrophoretic display 102 can be in a common location. For example, the substrate 104 and the electrophoretic display 102 can provide an exterior surface of a vehicle, and the control unit 120 can be on or within the vehicle. In at least one example, the control unit 120 can be secured to a portion of the substrate 104, such as an interior surface of the substrate 104 opposite from an exterior surface over which the electrophoretic display 102 is disposed. As another example, the control unit 120 is separate and distinct from the substrate 104, such as within an internal cabin of a vehicle. As another example, the control unit 120 can be remotely located from the electrophoretic display 102 and the substrate 104.

The system 101 can also include a user interface 122 in communication with the control unit 120, such as through one or more wired or wireless connections. The user interface 122 can include a display and an input device that allow an individual to control the electrophoretic display 102 via the control unit 120. The user interface 122 can be commonly located with the control unit 120. For example, the control unit 120 and the user interface 122 can form a computer workstation, a handheld device, and/or the like. As another example, the user interface 122 can be remotely located from the control unit 120. As another example, the control unit 120 can be configured to automatically control the electrophoretic display 102 without the user interface 122.

In operation, the control unit 120 operates the electrophoretic display 102 to selectively change one or more properties thereof. For example, the control unit 120 is configured to selectively change one or more properties of the electrophoretic display 102. In at least one example, the control unit 120 is configured to change properties such as a color, a reflectance, an absorptance, an emittance, and/or the like of the electrophoretic display 102.

Referring to FIGS. 1A and 1B, the control unit 120 can selectively change one or more properties of the electrophoretic display 102 by applying an electric charge to the electrophoretic display 102. In at least one example, the control unit 120 is configured to electrically rotate the microcapsules 114 of the electrophoretic display 102 to present a desired pigment on the substrate 104, such as an exterior surface of a vehicle. As a further example, the control unit 120 applies an electrical charge above or below the electrophoretic display 102, such as via the conductive coating 112, to shift a pigment position of one or more of the microcapsules 114, which alters an absorptance or reflectance of the surface 111 (such as an exterior surface) of the substrate 104. The clear coat 116 provides a protective sealing barrier, that provides a protective barrier for the microcapsules 114.

As described herein, the system 101 includes the substrate 104 having the surface 111. The electrophoretic display 102 is disposed on the surface 111. The control unit 120 is coupled to the electrophoretic display 102. The control unit 120 is configured to selectively change one or more properties of the electrophoretic display 102. In at least one example, the substrate 104 is a portion of a vehicle. The vehicle can be an aircraft. As another example, the vehicle can be a spacecraft. In at least one example, the surface 111 is an exterior surface of the vehicle.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 120 may be or include one or more processors that are configured to control operation, as described herein.

The control unit 120 is configured to execute a set of instructions that are stored in one or more data storage units or elements (such as one or more memories), in order to process data. For example, control unit 120 may include or be coupled to one or more memories. The data storage units may also store data or other information as desired or needed. The data storage units may be in the form of an information source or a physical memory element within a processing machine.

The set of instructions may include various commands that instruct the control unit 120 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 120. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 120 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2A:
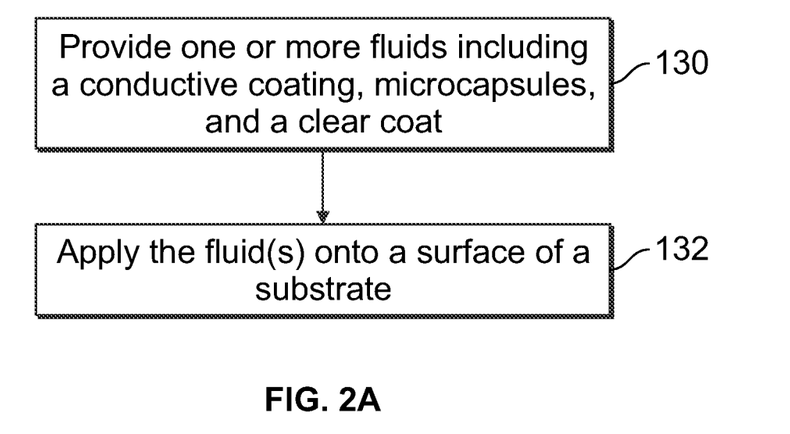
FIG. 2A illustrates a flow chart of a method, according to an example of the present disclosure.

FIG. 2A illustrates a flow chart of a method, according to an example of the present disclosure. Referring to FIGS. 1A and 2A, the method includes providing, at 130, one or more fluids 110 including the conductive coating 112, the microcapsules 114, and the clear coat 116. In at least one example, the fluid(s) 110 include one or more liquids, such as a paint. As another example, the fluid(s) 110 can include one or more aerosols. As another example, the fluid(s) 110 can include one or more gases that are configured to condense as liquids as they are deposited onto the substrate 104.

The method also includes applying, at 132, the fluid(s) 110 onto the surface 111 of the substrate 104. The applying provides the electrophoretic display 102 on the surface 111 of the substrate 104.

In at least one example, the applying 132 includes applying a single fluid 110 including the conductive coating 112, the microcapsules 114, and the clear coat 116 onto the surface 111 of the substrate 104. As another example, the applying 132 includes applying a first fluid 110 including the conductive coating 112 onto the surface 111 of the substrate 104, applying a second fluid 110 including the microcapsules 114 over the conductive coating 112, and applying a third fluid 110 including the clear coat 116 over the microcapsules 114. As another example, the applying 132 includes applying a first fluid 110 including the conductive coating 112 and the microcapsules 114 onto the surface 111 of the substrate 104, and applying a second fluid 110 including the clear coat 116 over the conductive coating 112 and the microcapsules 114. As another example, the applying 132 includes applying a first fluid 110 including the conductive coating 112 onto the surface 111 of the substrate 104, and applying a second fluid 110 including the microcapsules 114 and the clear coat 116 over the conductive coating 112.

Optionally, the electrophoretic display 102 can be provided by other methods that do not include providing and applying fluids. For example, the electrophoretic display 102 can be separately manufactured and mounted onto a substrate 104.

Figure 2B:
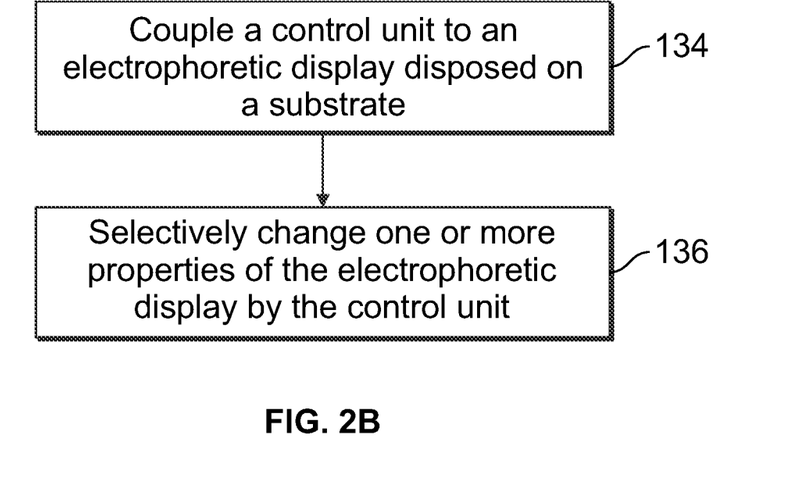
FIG. 2B illustrates a flow chart of a method, according to an example of the present disclosure.

FIG. 2B illustrates a flow chart of a method, according to an example of the present disclosure. Referring to FIGS. 1B and 2B, at 134, the control unit 120 is coupled to the electrophoretic display 102, which is disposed on the surface 111 of the substrate 104. For example, the control unit 120 is communicatively coupled to the electrophoretic display 102 through one or more wired or wireless connections, and is configured to control the electrophoretic display 102. At 136, the control unit 120 selectively changes one or more properties (such as a color, a reflectance, an absorptance, and/or the like) of the electrophoretic display 102. As an example, the control unit 120 applies an electric charge to change an orientation of one or more of the microcapsules 114 (shown in FIG. 1A) of the electrophoretic display 102, thereby changing one or more properties of the electrophoretic display 102.

Figure 3:
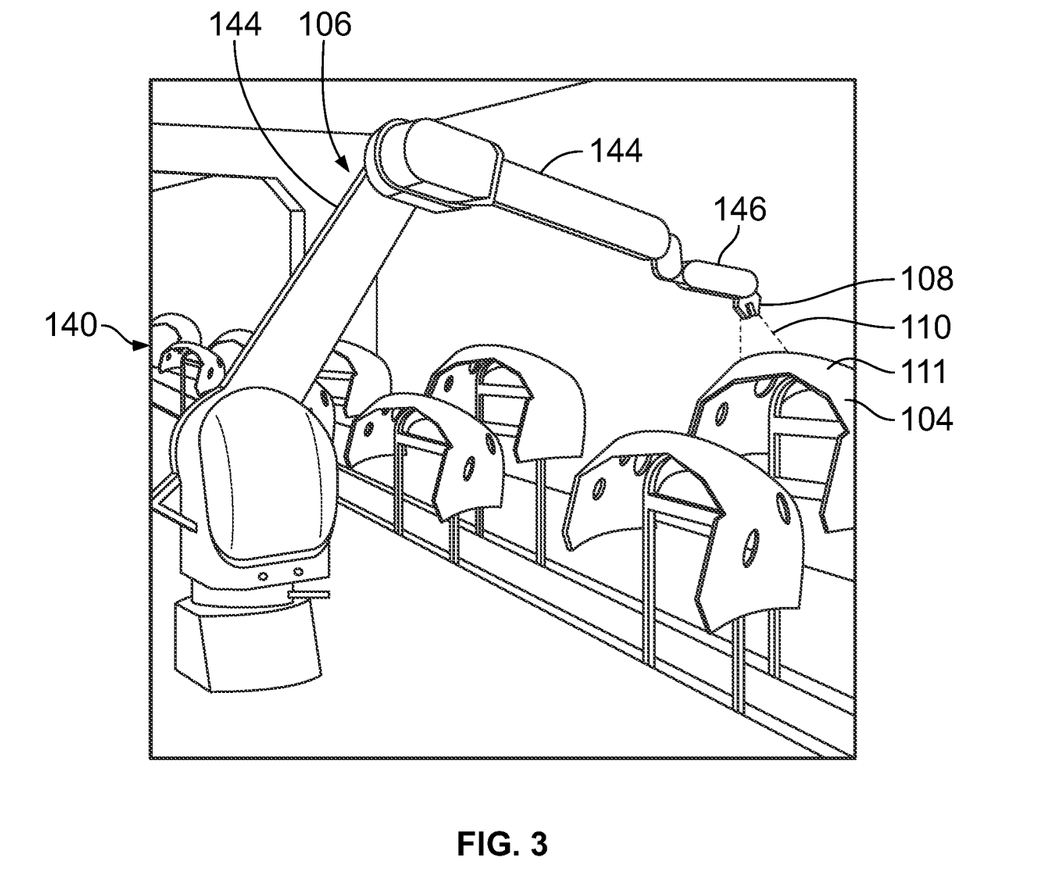
FIG. 3 illustrates a perspective view of an applicator, according to an example of the present disclosure.

FIG. 3 illustrates a perspective view of an applicator 106, according to an example of the present disclosure. In at least one example, the applicator 106 is a robot 140 including a base 142, one or more articulating arms 144, and an end effector 146 including the nozzle(s) 108. The applicator 106 deposits the fluid(s) 110 onto a surface 111 of a substrate 104, which can include complex curvatures.

Figure 4:
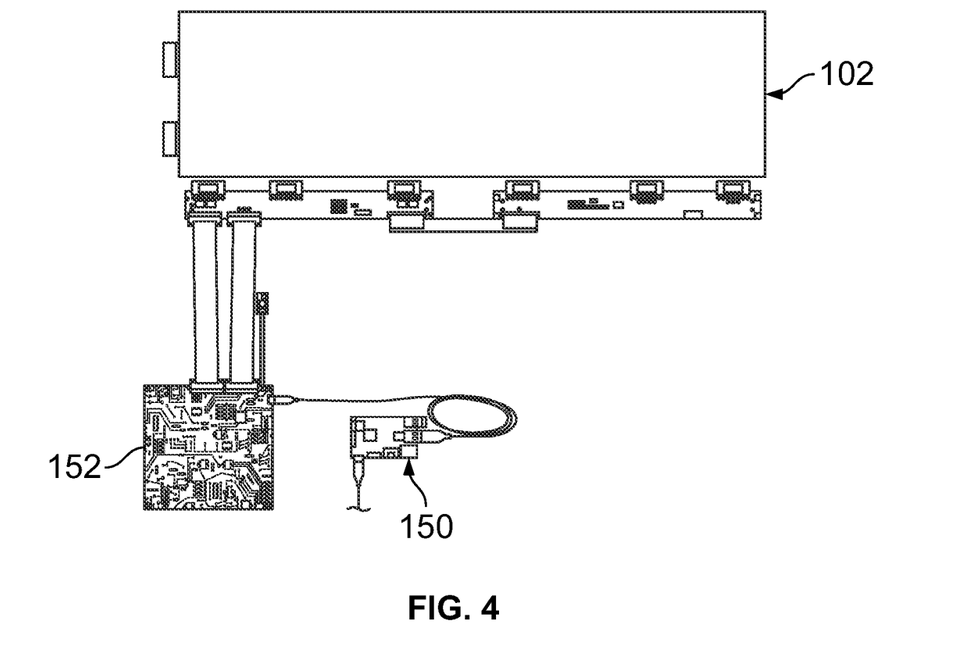
FIG. 4 illustrates a schematic diagram of an electrophoretic display, according to an example of the present disclosure.

FIG. 4 illustrates a schematic diagram of an electrophoretic display 102, according to an example of the present disclosure. A control unit 150 operates to control data that is sent to a driver card 152. The control unit 150 is an example of the control unit 120 shown in FIG. 1B. The driver card 152 outputs voltage to the electrophoretic display 102 according to a bit map, for example. Positive, negative, and partial charges dictate which pigment is shown in a particular microcapsule of the electrophoretic display 102.

In at least one example, a method can also include coupling the electrophoretic display 102 to the driver card 152 (such as through one or more wired or wireless connections), and coupling the driver card 152 to the control unit 150 (such as through one or more wired or wireless connections). The control unit 150 can be operated to change the appearance of the electrophoretic display 102.

Figure 5:
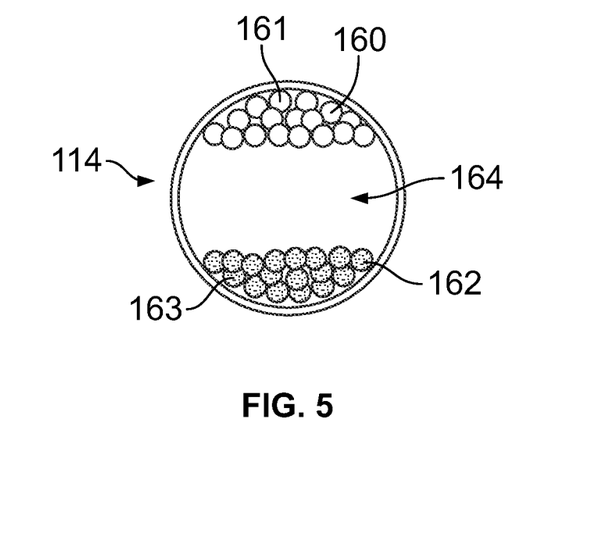
FIG. 5 illustrates a simplified representation of a microcapsule, according to an example of the present disclosure.

FIG. 5 illustrates a simplified representation of a microcapsule 114, according to an example of the present disclosure. As an example, each microcapsule 114 includes negatively charged white pigment 160 within ink particles 161, and positively charged black pigment 162 within ink particles 163. The ink particles 161 and 163 are suspended in a clear fluid 164. As described herein, the pigments 160 and 162 can be manipulated by an electric field to create a changeable appearance.

Referring to FIGS. 1A-5, in at least one example, the electrophoretic display 102 does not require power to retain a particular appearance. Instead, power is used to change the appearance of the electrophoretic display 102. Further, the electrophoretic display 102 can provide a reflective display in that ambient light from an environment is reflected from the display to eyes of an individual. The electrophoretic display 102 can also mimic appearance of traditional ink and paper. Unlike a liquid crystal display, no backlight is needed for the electrophoretic display 102. Further, the electrophoretic display 102 is easily readable in relation to sunlight, and at wide view angles.

In at least one example, the control unit 120 is configured to apply an electrical signal to the electrophoretic display 102, such as via the conductive coating 112, to change an orientation of the microcapsules 114. For example, in response to the control unit 120 applying the electrical signal, one or more of the microcapsules 114 rotate so that the positively charged black pigments 162 outwardly face from the substrate 104 (with the negatively charged white pigments 160 being rotated behind the positively charged black pigments 162). The control unit 120 can apply another electrical signal (or optionally cease applying an electrical signal) to rotate the microcapsules 114 so that the negatively charged white pigments 160 outwardly face from the substrate 104 (with the positively charged black pigments being rotated behind the negatively charged white pigments 160). In this manner, the control unit 120 operates the electrophoretic display 102 to selectively change one or more properties of the substrate 104. By changing the absorptance and reflectance of the electrophoretic display 102, the control unit 120 is able to control thermal properties of the substrate 104. For example, a lighter color reflects more light, while a darker color absorbs more light.

Figure 6A:
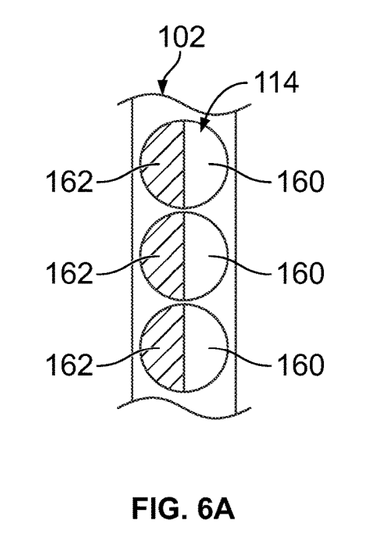
FIG. 6A illustrates a simplified representation of a portion of an electrophoretic display having microcapsules in a first orientation, according to an example of the present disclosure.
Figure 6B:
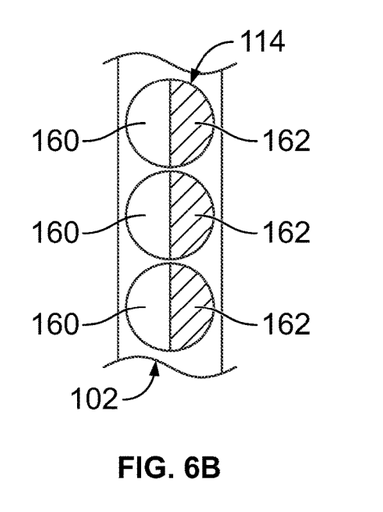
FIG. 6B illustrates a simplified representation of the portion of the electrophoretic display having the microcapsules in a second orientation.

FIG. 6A illustrates a simplified representation of a portion of an electrophoretic display 102 having microcapsules 114 in a first orientation, according to an example of the present disclosure. FIG. 6B illustrates a simplified representation of the portion of the electrophoretic display 102 having the microcapsules 114 in a second orientation. Referring to FIGS. 1B, 5, 6A, and 6B, the control unit 120 operates to selectively change an orientation of the microcapsules 114 so that a desired pigment is outwardly presented on the substrate 104. In at least one example, the control unit 120 electronically controls the electrophoretic display 102 to selectively rotate the microcapsules 114 to provide a desired outward appearance of the substrate 104. The outward appearance has one or more properties (such as a color, a reflectance, an absorptance, and/or the like) that is selectively changeable by the control unit 120 changing orientations of the microcapsules 114.

Figure 7:
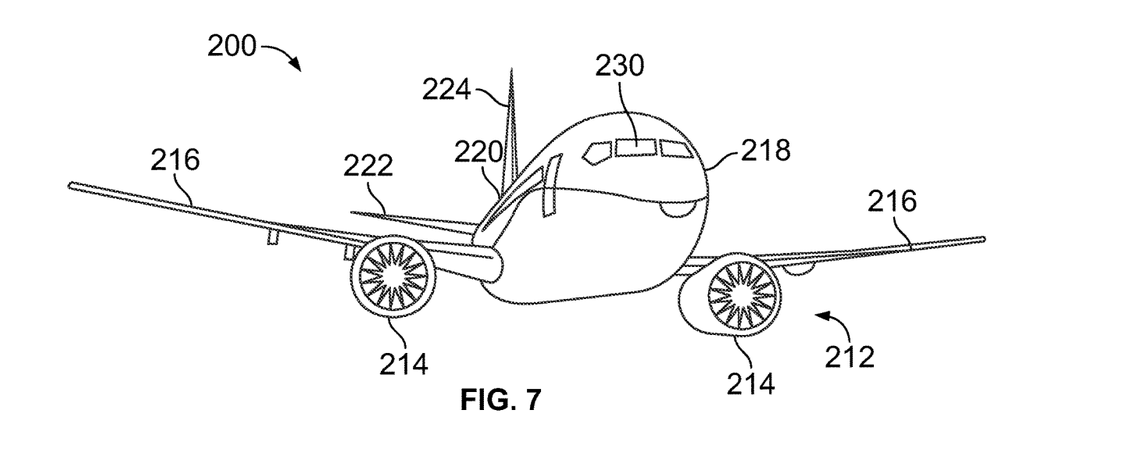
FIG. 7 illustrates a perspective front view of an aircraft, according to an example of the present disclosure.

FIG. 7 illustrates a perspective front view of an aircraft 200, according to an example of the present disclosure. The aircraft 200 includes a propulsion system 212 that includes engines 214, for example. Optionally, the propulsion system 212 may include more engines 214 than shown. The engines 214 are carried by wings 216 of the aircraft 200. In other examples, the engines 214 may be carried by a fuselage 218 and/or an empennage 220. The empennage 220 may also support horizontal stabilizers 222 and a vertical stabilizer 224. The fuselage 218 of the aircraft 200 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. Referring to FIGS. 1A-7, the aircraft 200 includes one or more electrophoretic displays 102, such as on outer surfaces of the fuselage 218, and/or within the internal cabin 230.

FIG. 7 shows an example of an aircraft 200. It is to be understood that the aircraft 200 can be sized, shaped, and configured differently than shown in FIG. 7. Optionally, examples of the present disclosure can be used with various other vehicles. For example, instead of an aircraft, the vehicle can be a land-based vehicle, such as an automobile, a bus, a train car, or the like. As another example, the vehicle can be a watercraft. As another example, the vehicle can be a spacecraft. Optionally, examples of the present disclosure can be used with fixed structures, such as residential or commercial buildings.

Figure 8:
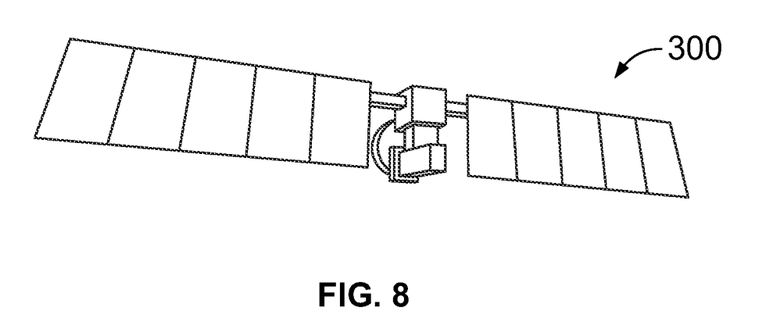
FIG. 8 illustrates a perspective front view of a spacecraft, according to an example of the present disclosure.

FIG. 8 illustrates a perspective front view of a spacecraft 300, according to an example of the present disclosure. Referring to FIGS. 1A, 1B, and 8, in at least one example, the vehicle is a spacecraft, such as a rocket, a satellite, or the like, having a substrate 104, such as one or more exterior surfaces. The control unit 120 is configured to change orientations of the microcapsules 114 of the spacecraft 300 to provide passive thermal management without the need for louvers, for example.

Figure 9:
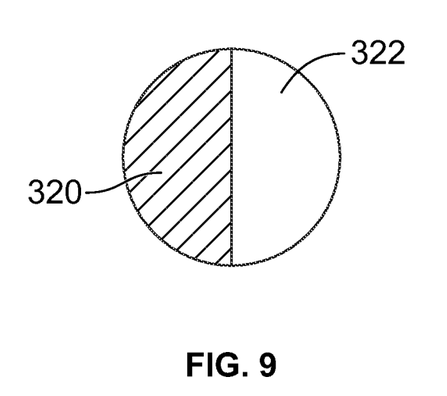
FIG. 9 illustrates a simplified representation of a microcapsule, according to an example of the present disclosure.

FIG. 9 illustrates a simplified representation of a microcapsule 114, according to an example of the present disclosure. The microcapsule 114 includes black pigment 320 and white pigment 322. As non-limiting examples, the white pigment 322 can be aluminate-gallate white pigment having a solar absorptance of less than 0.09, or zinc oxide white pigment having a solar absorptance of less than 0.15. The spacecraft 300 of FIG. 8 can include an electrophoretic display having microcapsules configured as shown in FIG. 9. The microcapsule 114 shown and described with respect to FIG. 9 is merely exemplary, and is non-limiting.

Figure 10:
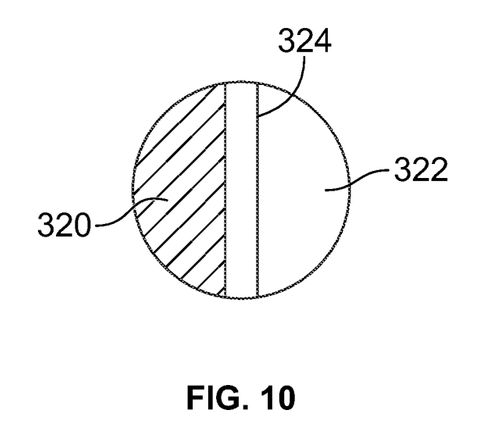
FIG. 10 illustrates a simplified representation of a microcapsule, according to an example of the present disclosure.

FIG. 10 illustrates a simplified representation of a microcapsule 114, according to an example of the present disclosure. The microcapsule 114 includes black pigment 320, and a vapor deposited metal flake 324 within a body 322. As a non-limiting example, the metal flake 324 has a solar absorptance of 0.08. The spacecraft 300 of FIG. 8 can include an electrophoretic display having microcapsules configured as shown in FIG. 10. The microcapsule 114 shown and described with respect to FIG. 10 is merely exemplary, and is non-limiting.

Further, the disclosure comprises examples according to the following clauses:

Clause 1. A system comprising:
a substrate having a surface;
an electrophoretic display disposed on the surface; and
a control unit coupled to the electrophoretic display, wherein the control unit is configured to selectively change one or more properties of the electrophoretic display.

Clause 2. The system of Clause 1, wherein the substrate is a portion of a vehicle.

Clause 3. The system of Clause 2, wherein the vehicle is an aircraft.

Clause 4. The system of Clause 2, wherein the vehicle is a spacecraft.

Clause 5. The system of any of Clauses 2-4, wherein the surface is an exterior surface of the vehicle.

Clause 6. The system of any of Clauses 1-5, wherein the electrophoretic display comprises microcapsules that contain pigment, and wherein the microcapsules are configured to change appearance when subjected to an electrical signal applied by the control unit.

Clause 7. The system of Clause 6, wherein the electrophoretic display further comprises a conductive coating.

Clause 8. The system of Clause 7, wherein the electrical signal includes an electrical charge applied above or below the conductive coating to shift a pigment position of one or more of the microcapsules and alter an absorptance or reflectance of the surface.

Clause 9. The system of Clauses 7 or 8, wherein the electrophoretic display further comprises a clear coat.

Clause 10. The system of any of Clauses 1-9, wherein the control unit is configured to selectively change the one or more properties of the electrophoretic display by applying an electric charge to the electrophoretic display.

Clause 11. The system of any of Clauses 1-10, wherein the control unit is configured to electrically rotate one or more microcapsules of the electrophoretic display to present a desired pigment on the substrate.

Clause 12. A vehicle comprising:
a substrate having a surface;
an electrophoretic display disposed on the surface; and
a control unit coupled to the electrophoretic display, wherein the control unit is configured to selectively change one or more properties of the electrophoretic display.

Clause 13. The vehicle of Clause 12, wherein the surface is an exterior surface of the vehicle.

Clause 14. The vehicle of Clauses 12 or 13, wherein the vehicle is an aircraft or a spacecraft.

Clause 15. The vehicle of any of Clauses 12-14, wherein the electrophoretic display comprises microcapsules that contain pigment, and wherein the microcapsules are configured to change appearance when subjected to an electrical signal applied by the control unit.

Clause 16. The vehicle of Clause 15, wherein the electrophoretic display further comprises a conductive coating, and a clear coat.

Clause 17. The vehicle of any of Clauses 12-16, wherein the control unit is configured to selectively change the one or more properties of the electrophoretic display by applying an electric charge to the electrophoretic display.

Clause 18. The vehicle of any of Clauses 12-17, wherein the control unit is configured to electrically rotate one or more microcapsules of the electrophoretic display to present a desired pigment on the substrate.

Clause 19. A method comprising:
disposing an electrophoretic display on a surface of a substrate, wherein the electrophoretic display comprises microcapsules that contain pigment, and wherein the microcapsules are configured to change appearance when subjected to an electrical signal; and
selectively changing, by a control unit coupled to the electrophoretic display, one or more properties of the electrophoretic display.

Clause 20. The method of Clause 19, wherein the substrate is a portion of a vehicle, and wherein the surface is an exterior surface of the vehicle.

Clause 21. The method of Clauses 19 or 20, wherein said selectively changing comprises applying an electric charge to the electrophoretic display, and wherein said applying the electric charge rotates one or more of the microcapsules of the electrophoretic display to present a desired pigment on the substrate.

As described herein, examples of the present disclosure provide systems and methods for forming a dynamic display, such as can be used within an interior cabin of a vehicle. Further, examples of the present disclosure provide effective and efficient dynamic displays that are lighter and/or smaller than typical electronic displays, and which use less power than typical electronic displays.

As described herein, examples of the present disclosure provide systems and methods for dynamically controlling a surface of a vehicle, such as an exterior surface of an aircraft, spacecraft, or the like.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a substrate having a surface;
an electrophoretic display disposed on the surface, wherein the electrophoretic display comprises:
microcapsules that contain pigment, and wherein the microcapsules are configured to change appearance when subjected to an electrical signal applied by the control unit; and
a conductive coating, wherein the microcapsules and the conductive coating are mixed together; and
a control unit coupled to the electrophoretic display, wherein the control unit is configured to selectively change one or more properties of the electrophoretic display.

2. The system of claim 1, wherein the substrate is a portion of a vehicle.

3. The system of claim 2, wherein the vehicle is an aircraft.

4. The system of claim 2, wherein the vehicle is a spacecraft.

5. The system of claim 2, wherein the surface is an exterior surface of the vehicle.

6. The system of claim 1, wherein the electrical signal includes an electrical charge applied above or below the conductive coating to shift a pigment position of one or more of the microcapsules and alter an absorptance or reflectance of the surface.

7. The system of claim 1, wherein the electrophoretic display further comprises a clear coat, wherein the clear coat is mixed together with the microcapsules and the conductive coating.

8. The system of claim 7, wherein the microcapsules, the conductive coating, and the clear coat are mixed together as a single fluid.

9. The system of claim 1, wherein the control unit is configured to selectively change the one or more properties of the electrophoretic display by applying an electric charge to the electrophoretic display.

10. The system of claim 1, wherein the control unit is configured to electrically rotate one or more microcapsules of the electrophoretic display to present a desired pigment on the substrate.

11. The system of claim 1, wherein the microcapsules and the conductive coating are mixed together in a paint that is applied to the surface of the substrate.

12. A vehicle comprising:
a substrate having a surface;
an electrophoretic display disposed on the surface, wherein the electrophoretic display comprises:
microcapsules that contain pigment, and wherein the microcapsules are configured to change appearance when subjected to an electrical signal applied by the control unit; and
a conductive coating, wherein the microcapsules and the conductive coating are mixed together; and
a control unit coupled to the electrophoretic display, wherein the control unit is configured to selectively change one or more properties of the electrophoretic display.

13. The vehicle of claim 12, wherein the surface is an exterior surface of the vehicle.

14. The vehicle of claim 12, wherein the vehicle is an aircraft or a spacecraft.

15. The vehicle of claim 12, wherein the electrophoretic display further comprises a clear coat, wherein the clear coat is mixed together with the microcapsules and the conductive coating.

16. The vehicle of claim 15, wherein the microcapsules, the conductive coating, and the clear coat are mixed together as a single fluid.

17. The vehicle of claim 12, wherein the control unit is configured to selectively change the one or more properties of the electrophoretic display by applying an electric charge to the electrophoretic display.

18. The vehicle of claim 12, wherein the control unit is configured to electrically rotate one or more microcapsules of the electrophoretic display to present a desired pigment on the substrate.

19. A method for a system comprising:
a substrate having a surface;
an electrophoretic display disposed on the surface, wherein the electrophoretic display comprises:
microcapsules that contain pigment, and wherein the microcapsules are configured to change appearance when subjected to an electrical signal applied by the control unit; and
a conductive coating, wherein the microcapsules and the conductive coating are mixed together; and
a control unit coupled to the electrophoretic display, wherein the control unit is configured to selectively change one or more properties of the electrophoretic display,
the method comprising:
mixing the microcapsules and the conductive coating together in a single fluid;
disposing the electrophoretic display on the surface of the substrate, wherein the electrophoretic display comprises microcapsules that contain pigment, and wherein the microcapsules are configured to change appearance when subjected to an electrical signal; and
selectively changing, by the control unit coupled to the electrophoretic display, the one or more properties of the electrophoretic display.

20. The method of claim 19, wherein the substrate is a portion of a vehicle, and wherein the surface is an exterior surface of the vehicle.

21. The method of claim 19, wherein said selectively changing comprises applying an electric charge to the electrophoretic display, and wherein said applying the electric charge rotates one or more of the microcapsules of the electrophoretic display to present a desired pigment on the substrate.

* * * * *